United States Patent [19]

Han et al.

[11] Patent Number: 5,181,185
[45] Date of Patent: Jan. 19, 1993

[54] PARALLEL MULTIPLIER USING SKIP ARRAY AND MODIFIED WALLACE TREE

[75] Inventors: Tack D. Han; Sang M. Moh, both of Seoul, Rep. of Korea

[73] Assignee: Samsumg Electronics Co., Ltd., Suweon, Rep. of Korea

[21] Appl. No.: 638,449

[22] Filed: Jan. 4, 1991

[30] Foreign Application Priority Data

May 31, 1990 [KR] Rep. of Korea ............... 90-8199

[51] Int. Cl.$^5$ .............................................. G06F 7/52
[52] U.S. Cl. .................................................. 364/760
[58] Field of Search ............... 364/760, 757, 754, 786, 364/784, 787, 788

[56] References Cited

U.S. PATENT DOCUMENTS

| 4,153,938 | 5/1979 | Ghest et al. | 364/757 |
| 4,556,948 | 12/1985 | Mercy | 364/786 |
| 4,575,812 | 3/1986 | Kloker et al. | 364/760 |
| 4,918,639 | 4/1990 | Schwarz et al. | 364/754 |
| 4,999,804 | 3/1991 | Nukiyama | 364/784 |

Primary Examiner—Long T. Nguyen
Attorney, Agent, or Firm—Ladas & Parry

[57] ABSTRACT

A parallel multiplier by a skip array and a modified Wallace tree utilizes a modified Booth's encoder for encoding a multiplier according to a modified Booth's algorithm, a skip array for partial products, a modified wallace tree for adding binary bits, and a hybrid prefix adder for adding the final two lines. Fast multiplication of O (log n) is continuously performed without a standby state of a carry output and the regularity of the arrangement of the parallel multiplier is improved so that its chip area and manufacturing cost are reduced.

7 Claims, 7 Drawing Sheets

SAP

2 Outputs
MWT

HPA

PARALLEL MULTIPLIER USING SKIP ARRAY AND MODIFIED WALLACE TREE

BACKGROUND OF THE INVENTION

The present invention relates to a parallel multiplier and, more particularly, to a parallel binary multiplier using a modified Booth's algorithm, a skip array, and a modified Wallace tree.

The parallel binary multiplier has been widely employed in various systems such as a ALU (Arithmetic Logic Unit) of high-performance computers, a facsimile telegraph, a digital signal processing system, a matrix multiplier, and also for a specially purposed chip so lots of methods have been proposed to reduce chip areas and improve operation speed of the parallel binary multiplier. For example, it is well known that multiplication speed of the parallel multiplier can be considerably improved by using the modified Booth's algorithm as disclosed in "COMPUTER ARITHMETIC" (pp.129~212, 1979) and "NIKKEI ELECTRONICS" (pp.76~89, May 29, 1978) by John Wiley & Sons Co.

The conventional parallel multipliers are based on various algorithms and techniques. Among many multipliers have been proposed, general multipliers with superior performance are divided into two kinds, both producing n/2 partial product lines in its initial step by the modified Booth's algorithms where n is bit numbers of two inputs of multiplier Y and multiplicand X. The most essential part of such parallel multipliers is a multi-operand addition circuit which adds the n/2 partial product lines each other and reduces them to two lines. To realize this adder circuit, a full adder array and the Wallace tree are employed.

The parallel multiplier using the array is arranged into a two-dimensional array structure composed of full adder cells. In this kind of multipliers, the outputs of cells in a present line are sequentially inputted to cells in a next line. Thus, this kind of multipliers have a delay time complexity of O(n) and have a basically slow multiplication time.

FIG. 1 shows a schematic overall structure of a conventional parallel multiplier using the array. In FIG. 1, a 16-bit multiplicand X is provided to eight multiplicand adder cells CL1, CL2, CL3..., CL8 and a 16-bit multiplier Y is provided to a modified Booth's encoder MBE. Then, the modified Booth's encoder MBE encodes the 16-bit multiplier Y according to the modified Booth's algorithm and provides such encoded outputs to the eight adder cells CL1, CL2, CL3..., CL8, where each encoded output is a 3-bit signal.

The first to eighth line adder cells CL1~CL8 respectively add the multiplicand X to the encoded output of the modified Booth's encoder MBE and the first line adder cell CL1 provides its output to the second line adder cell CL2. Then, the output value of the first line adder cell CL1 is added again to the output value of the second line adder cell CL2, thereto the multiplication value of the second line adder cell CL2 is sequentially added and finally provided to a fast adder FAD. For the multiplication of complements, four bits of two least significant bits and its complements are provided to the fast adder FAD from each line adder cell. Thus, a resultant of the fast adder FAD has finally 2n-bit value. In the parallel multiplier, the outputs of each line are sequentially provided to each next line as mentioned above.

Consequently, the multiplication time of two inputs is slow proportionally to the number of bits of the inputs. Thus this multiplier is not suitable for a high speed multiplication even though this type of multiplier is easily applicable for small bits, low speed, and small chip area.

On the other hand, the parallel multipliers using the Wallace tree has faster operation time of 0 ( log n), but a large chip area is required with irregular structure. Thus, this Wallace tree is not suitable for a small chip area and a low cost. Further, as shown in FIG. 6, a carry output is provided after one gate delay and a sum output is provided after two gates delay, since in general CMOS or NMOS circuits the sum is obtained by using the carry output which is in a standby state until the sum is provided so the carry output formerly provided is not directly added. FIG. 2 shows a schematic overall structure of a conventional multiplier using the Wallace tree and FIG. 5 shows a schematic structure of the Wallace tree.

In both multipliers using the array or the Wallace tree, the final step is to add two final lines. These two kinds of the conventional adders still have the problems associated with the multiplication speed and the chip area. Thus, the necessity for more effective multipliers which can improve the multiplication speed and reduce the chip area still remains.

SUMMARY OF THE INVENTION

The present invention has an object to provide a parallel multiplier using the modified Booth's algorithm, the skip array, and the modified Wallace tree wherein the chip area can be minimized and also the multiplication speed can be improved. According to the present invention, the improvement of the multiplication time of two inputs is achieved by using the skip array, the modified Wallace tree structure and a hybrid prefix adder having an operation time complexity of 0 (log n).

The present invention has another object to provide a parallel multiplier wherein the chip area is minimized by improving the regularity of the structure and the design is simple by using the skip array and the hybrid prefix adder.

BRIEF DESCRIPTION OF DRAWINGS

These and other objects, features, and advantages of the present invention will become more apparent from the following description for the preferred embodiments taken in conjunction with the accompanying drawings, in which:

FIGS. 6A and 6B are a circuit diagrams illustrating a CMOS full adder cell according to the present invention, in which FIG. 6(A) is a positive input-negative output logic and FIG. 6(B) is a negative input-positive output logic.

DETAILED DESCRIPTION OF THE PREFERRED EMBODIMENTS

The present invention will be now described in more detail with reference to the accompanying drawings.

Figure 3:
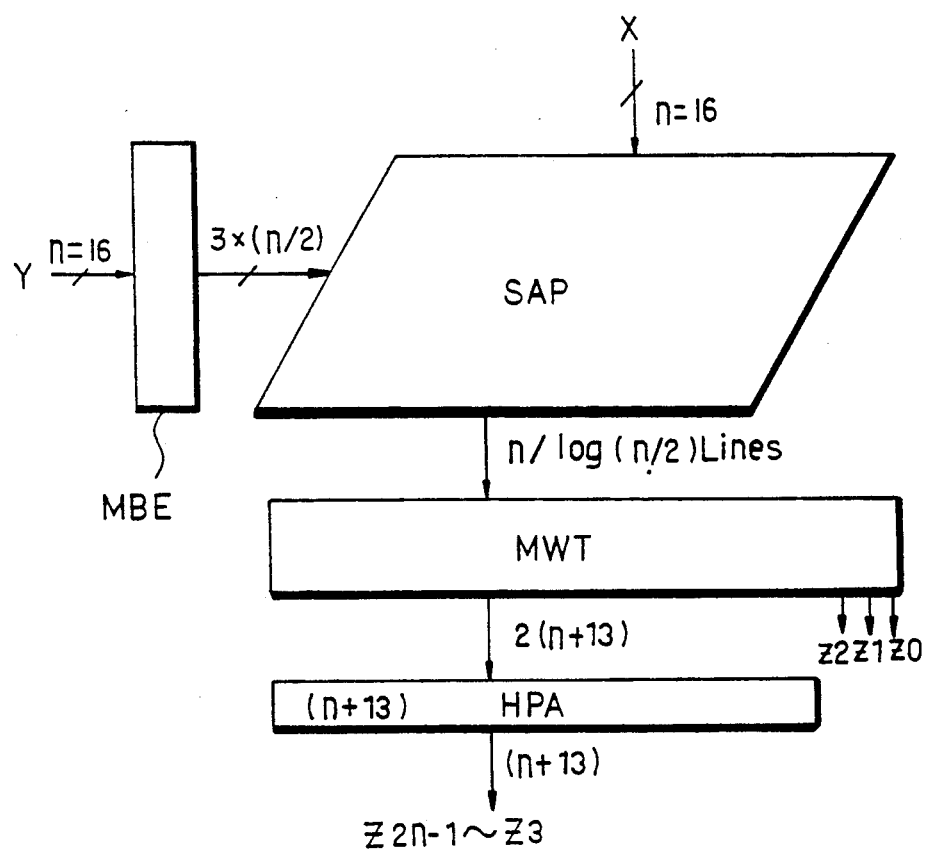
FIG. 3 is a diagram illustrating a parallel multiplier according to the present invention.

FIG. 3 shows a schematic overall structure of a parallel multiplier according to the present invention. In FIG. 3, the present invention comprises a modified Booth's encoder MBE for encoding a value of a multiplier Y according to the modified Booth's algorithm, a skip array SAP connected to the modified Booth's encoder MBE for producing partial produce lines of a multiplicand X by the encoded value and for adding the partial product lines after skipping a predetermined skip interval, a modified Wallace tree MWT connected to the skip array SAP for rapidly adding binary numbers provided from the skip array SAP, and a hybrid prefix adder HPA connected to the modified Wallace tree MWT for adding values of two lines provided from the modified Wallace tree MWT.

First, n/2 partial product lines are produced by using the modified Booth's algorithm for a parallel multiplication of two n-bit signals X and Y, where n(=16) indicates a bit of an input signal. Next, the modified Booth's encoder MBE produces 3 * (n/2) encoded outputs from the multiplier Y to be provided to the skip array SAP. Then, the skip array SAP produces the partial product lines by the multiplicand X and the encoded outputs of the modified Booth's encoder MBE to be provided to the modified Wallace tree MWT.

Figure 1:
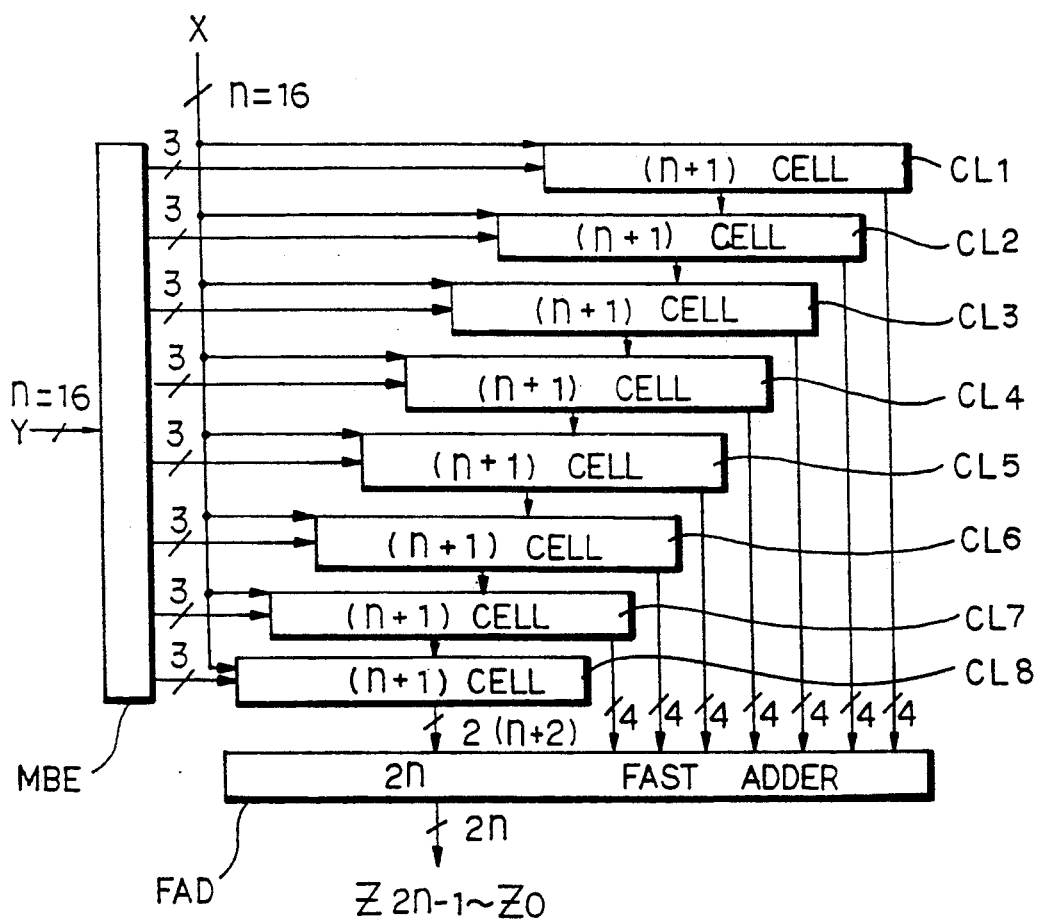
FIG. 1 is a diagram illustrating an array-type parallel multiplier using a conventional Booth's algorithm.

The method of producing the partial product rows is the same as that described in FIG. 1. Particularly, the skip array SAP reduces the number of the partial products from n/2 to n/log (n/2). The skip array SAP also improves the regularity of the multiplier structure with the multiplication time of O(log n), and minimized the chip area with a simple design.

Next, the modified Wallace tree MWT is used to reduce the resultants of the skip array SAP into two lines by adding them repeatedly. The modified Wallace tree MWT has a faster multiplication time than that of the conventional Wallace tree since the carry output has no standby state. In order to improve the multiplication time and the chip area, each cell of the skip array SAP and the modified Wallace tree MWT is composed with positive input-negative output cells and negative input-positive output cells which are arranged in turn.

Finally, the hybrid prefix adder HPA having a small chip area and a high speed is used to add the final two lines. In view of the parallel multiplier using the conventional array, the present invention has a faster multiplication time reduced from O(n) to O(log n), even though the chip area is increased.

Further, according to the present invention the parallel multiplier with the skip array SAP and the modified Wallace tree MWT reduces the complexity of $O(2n^2 \log n)$ to $O(n^2 \log n + 2n^2)$, so that the chip area can be minimized and the multiplication speed becomes faster in the range of less than 128-bits even though the multiplication time is O(log n) equivalently to the conventional case.

According to this circuit, since the adding two numbers of n-bits is carried out by the combination of the modified Booth's encoder MBE, the skip array SAP, the modified Wallace tree MWT and the hybrid prefix adder HBA, the output becomes 2n-bit and (n/2) * 3 encoded output lines are generated from the multiplier Y by using the modified Booth's encoder MBE according to the modified Booth's algorithm. Therefore, three encoded outputs of ith lines are as follows:

$$ONEi = y_{2i} \oplus y_{2i-1}$$

$$TWOi = (y_{2i_2} + i)' \cdot y_{2i} \cdot y_{2i-i} + y_{2i} + i \cdot (y_{2i})' \cdot (y_{2i} - i)'$$

$$NEGi = y_{2i} + i((y_{2i}' + (y_{2i} - i)')$$

($0 \leq i \leq n/2 - 1$ and $y_{-1} = 0$), where the symbol "'" indicates "—" which means logic "not".

Since the partial product line is produced from the three encoded output lines, the n/2 partial product lines are generated by applying the output lines of the modified Booth's encoder MBE and the n-bit multiplicand to respective adder cells. A jth bit of the ith partial product line is as follows:

$$P_{i,j} = (ONEi.Xj + TWOi.Xj - i) \oplus NEGi$$

($0 \leq i \leq n/2 - 1$, $0 \leq j \leq n$, $X_{-1} = 0$ and $Xn = Xn - 1$)

The partial product Pi,j is left-shifted by two bits as the subscript i is increased by one, so that the subscript j representing a column is increased by two.

Figure 4:
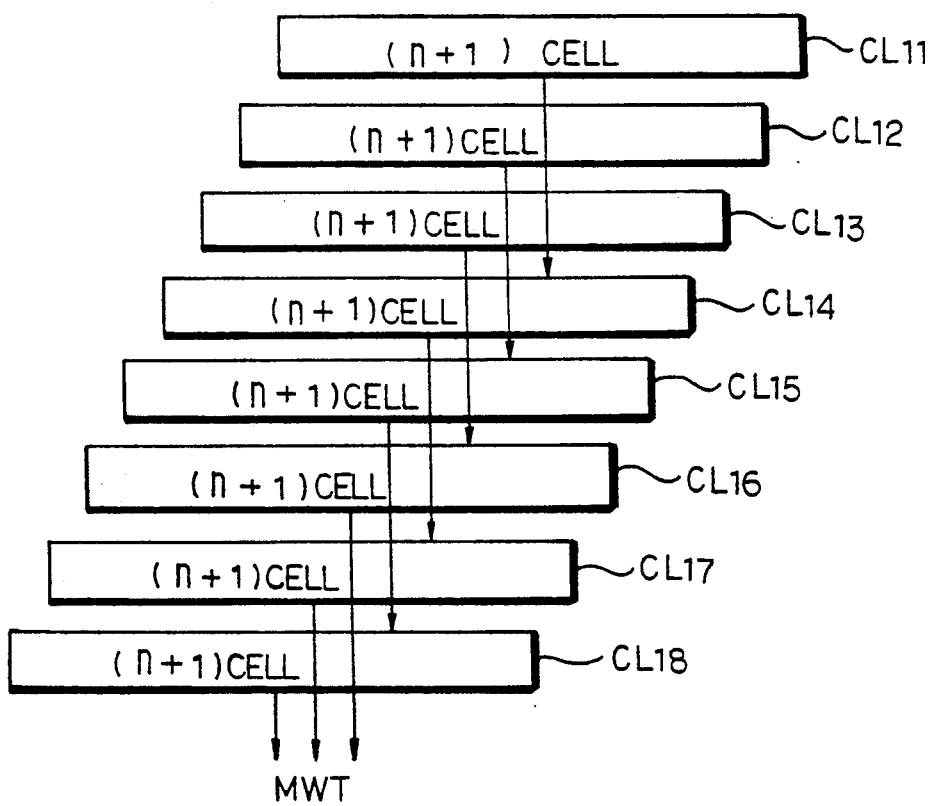
FIG. 4 is a diagram illustrating the structure of a skip array according to the present invention.

The number of the partial product lines is reduced from n/2 to n/log (n/2) by using the skip array SAP. The structure of the skip array SAP is shown in FIG. 4. The skip array SAP includes a first line adder cell CL11, a second line adder cell CL12, ..., and an eighth line adder cell CL18. The first line adder cell CL11 is operated with the fourth line adder cell CL14 by skipping three lines and similarly, the second line adder cell CL12 is operated with the fifth line adder cell CL15. Therefore, each line adder cell is operated after skipping three lines.

In order to make the operation time proportional to log (n/2), the skip interval is determined to be n/(2 log (n/2)). Then, n/2·partial product lines are respectively composed of log (n/2) groups by n/(2 log (n/2)) lines, where first three groups are simultaneously added by the full adder cell so that the skip interval becomes log (n/2)−3 and the operation time of the skip array SAP becomes log (n/2)−2. The carry and sum outputs of each cell in a present group are provided to corresponding lines in a next group, and particularly the carry output is provided to one-weight higher cell.

The carry output Ci,j and sum output Si,j of the full adder cell in the ith line and the jth column are respectively represented as follows:

$$C_{i,j} = fc(P_{i,j}, S_{i-n/2 \log (n/2),j}, C_{i-n/2 \log (n/2), j-1})$$

$$S_{i,j} = fs(P_{i,j}, S_{i-n/2 \log (n/2),j}, C_{i-n/2 \log (n/2), j-1})$$

and fs represent functions for obtaining the carry and sum outputs respectively and each of three arguments represents a augend, a addent, and the carry respectively and the commutative law is satisfied. Also, i is in the range of n/log (n/2) to n/2−1, while j is in the range of 2i to 2i+n.

On the other hand, in the case where the Ci,j is zero and the Si,j equals Pi,j in the range of $0 \leq i \leq n/\log (n/2) - 1$, then Pi,j, Si,j, and Ci,j are regarded to be zero in the predetermined range of i and j. The n/log (n/2) bit lines are provided to the modified Wallace tree MWT and finally reduced to two lines. The modified Wallace tree MWT has a fast operation time by removing the standby state of the carry output from each cell. In the conventional Wallace tree, however, the carry output of a CMOS full adder cell is provided after one gate delay and the sum output is provided after another one gate delay by using the carry output so that the sum output requires two-gate delay as shown in FIG. 6, since the carry output is in the standby state until the sum output is provided. In order to reduce the operation time by removing this standby state of the carry output, the modified Wallace tree MWT directly provides the carry output to the next cell without the standby state, where respective full adder cells are arranged in turn with the positive input-negative output and the negative input-positive output as described hereinafter. As an example, the modified Wallace tree MWT as shown in FIG. 5(B) has almost the same size of chip area as the conventional Wallace tree but has a fast multiplication time.

Figure 5A:
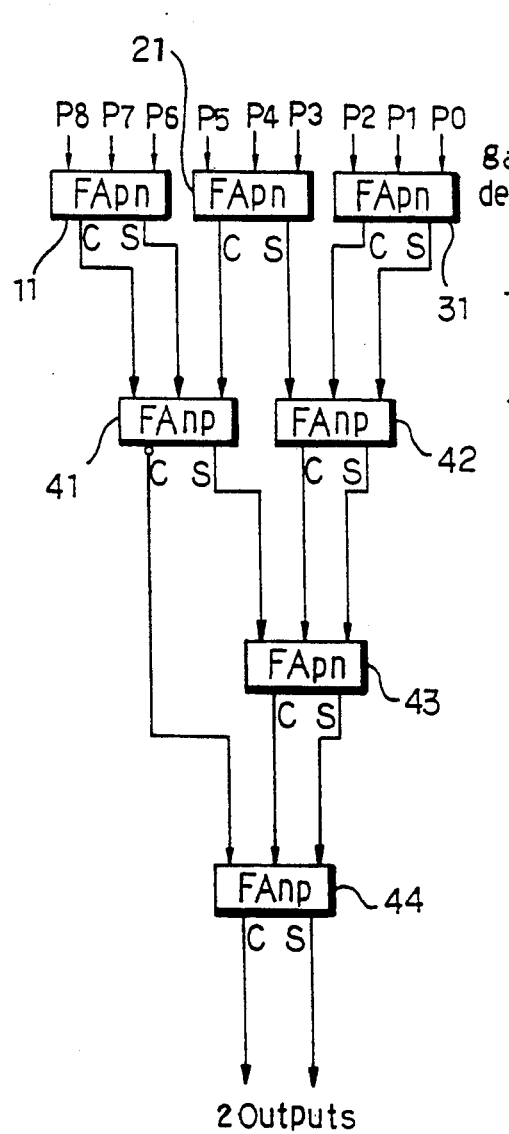
FIG. 5A is a diagram illustrating a conventional Wallace tree and FIG. 5B is a diagram illustrating a modified Wallace tree according to the present invention.

FIG. 5(A) shows the arrangement of the conventional Wallace tree. The multiplication output values P0~P8 of the skip array SAP are provided to full adders 11, 21, and 31. of the full adders 11, 21, and 31 the carry outputs and sum outputs are provided to is next full adders repeatedly so a 2-bit output is finally generated from two full adders 43 and 44.

Figure 2:
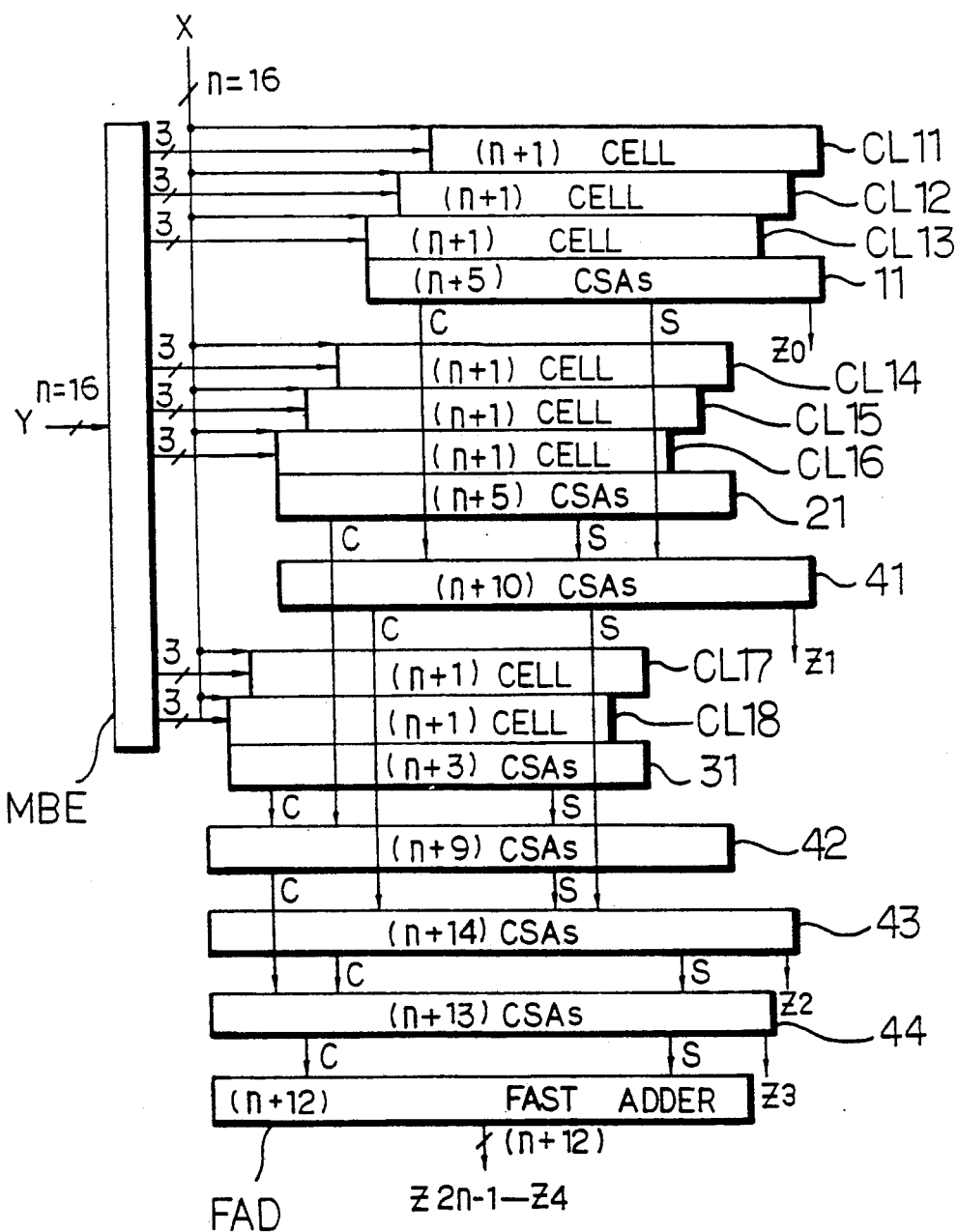
FIG. 2 is a diagram illustrating a parallel multiplier using the conventional Booth's algorithm and Wallace tree.

FIG. 2 shows the conventional parallel multiplier using the modified Booth's algorithm and the modified Wallace tree, where the modified Wallace tree has the similar structure as shown in FIG. 5(A) but its full adders are composed of only the positive input-positive output cells. The final carry and sum outputs of the full adder 44 is provided to the fast adder FAD to output the multiplication value. In the full adders, FApn represents the positive input-negative output cell, while FAnp represents the negative input-positive output cell.

Figure 5B:
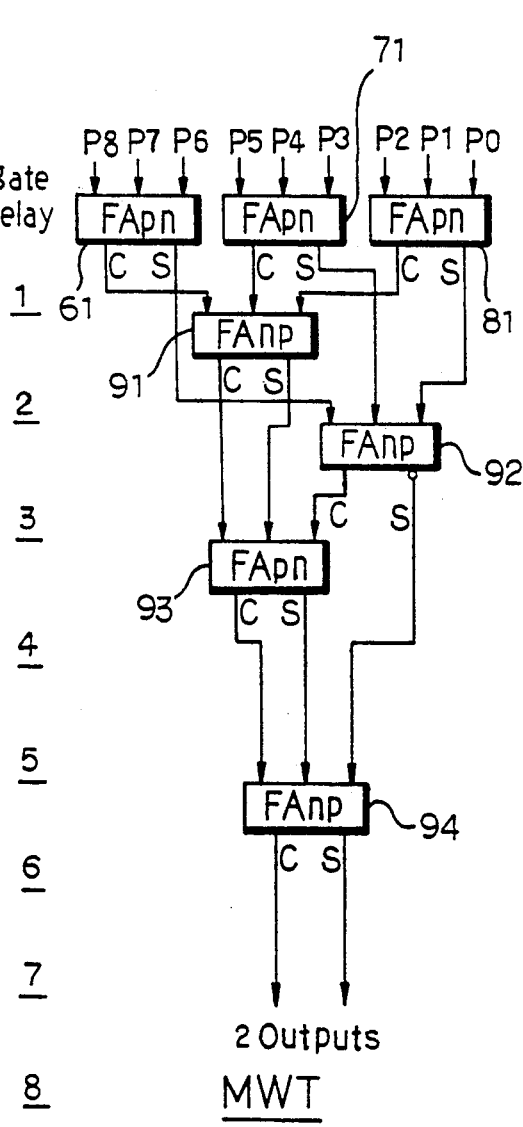

FIG. 5(B) shows the structure of the modified Wallace tree MWT according to the present invention. The modified Wallace tree MWT comprises full adders 61, 71, and 81 for receiving the multiplication outputs P0~P8 of the skip array SAP, a full adder 91 for adding the carry outputs of the full adders 61, 71, and 81, a full adder 92 for adding sum outputs of the full adder 61, 71, and 81, a full adder 93 for adding a sum output of a full adder 91 and the carry outputs of the full adders 91 and 92, and a full adder 94 for adding the carry output of the full adder 93 and the sum outputs of the full adders 92 and 93. In this circuit, the full adders for only carry outputs are separated from those for only sum outputs so that the standby state does not occur. Each cell of the skip array SAP and the modified Wallace tree MWT is basically a full adder.

In this parallel multiplier, the delay of a cell and the chip area are reduced at the same time by arranging the positive input-negative output cells and the negative input-positive output cells in turn. In this manner, inverters are removed from the cell output step and thus the outputs of each cell are provided fast by only one-gate delay and the number of gates is also reduced. The logic equations of the positive input-negative output of the full adder cell are as follows:

$$Cout' = (C_{in}(a+b)+a \cdot b)'$$

$$Sum' = (Cout'(a+b+C_{in})+a \cdot b \cdot C_{in})'$$

Figure 6A:
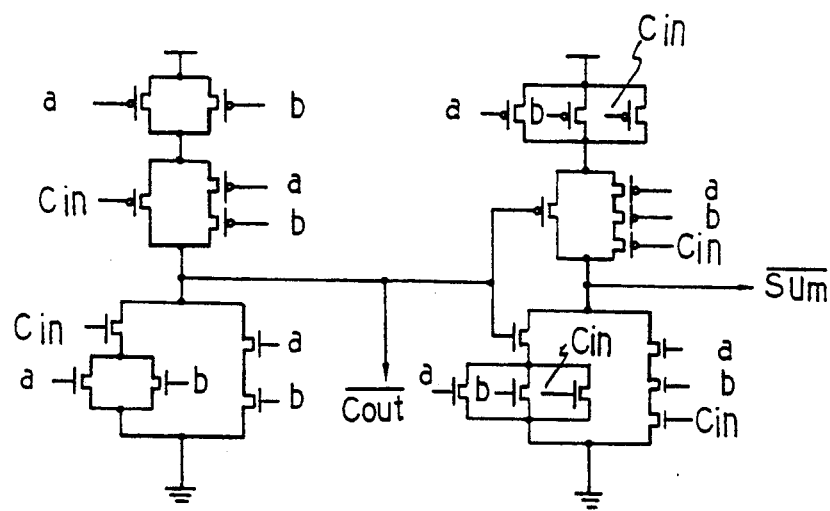

FIG. 6(A) shows the CMOS full adder for implementation of these equations. To the contrary, the logic equations of the negative input-positive output of the full adder cell are as follows:

$$Cout = ((Cin' + a' \cdot b') \cdot (a' + b'))'$$

$$Sum = ((Cout + a' \cdot b' \cdot Cin') \cdot (a' + b' + Cin'))'$$

Figure 6B:
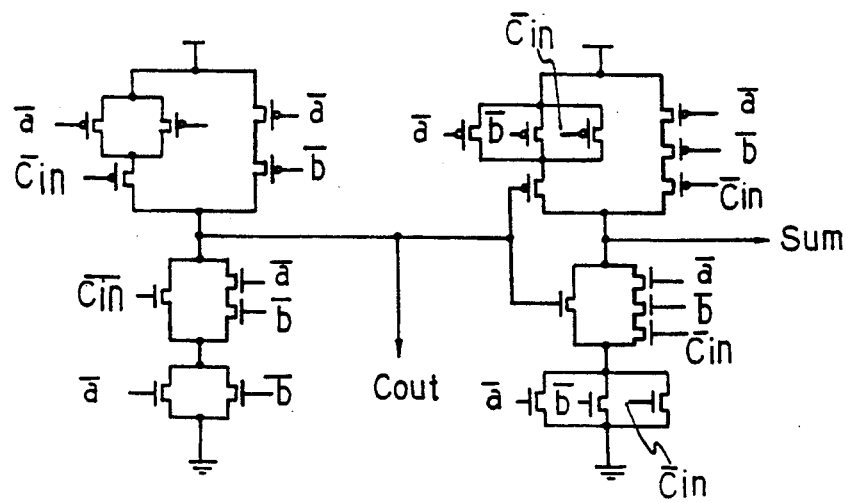

FIG. 6(B) shows the CMOS full adder for implementation of these equations, where a, b, Cin are respectively to be input signals and particularly Cin indicates the carry input provided from the one-weight higher bit. The hybrid prefix adder HPA is used at the final step of the parallel multiplier to effectively perform the addition. The hybrid prefix adder HPA is a superior adder with a small chip area and fast operation time so that when the hybrid prefix adder HPA is applied to the multiplier, the overall performance is improved. The logic functions of each cell are as follows:

i) pg cell $$(Pi.i)' = (ai+bi)'$$

$$(gi.i)' = (ai \cdot bi)'$$

ii) bp cell $$(Pj.2k+i)' = (Pi.2k.Pj.2k)'$$

$$(gj.2k+i)' = (Pj.2k.gi.2k+gj.2k)'$$

iii) bn cell $$Pj.2k = ((Pi.2k-i)' + (Pj.2k-i)')'$$

$$gj.2k = ((Pj.2k-i)' + (gi.2k-i)'(gj.2k-i)')'$$

iv) white cell $$Pi.k = (Pi.k-i)'$$

$$gi.k = (gi.k-i)'$$

v) sum cell $$si = ((ci+(Pi.i)' \cdot (ci-i)') ((gi.i)' + (c_i - 1))')'$$

Figure 7:
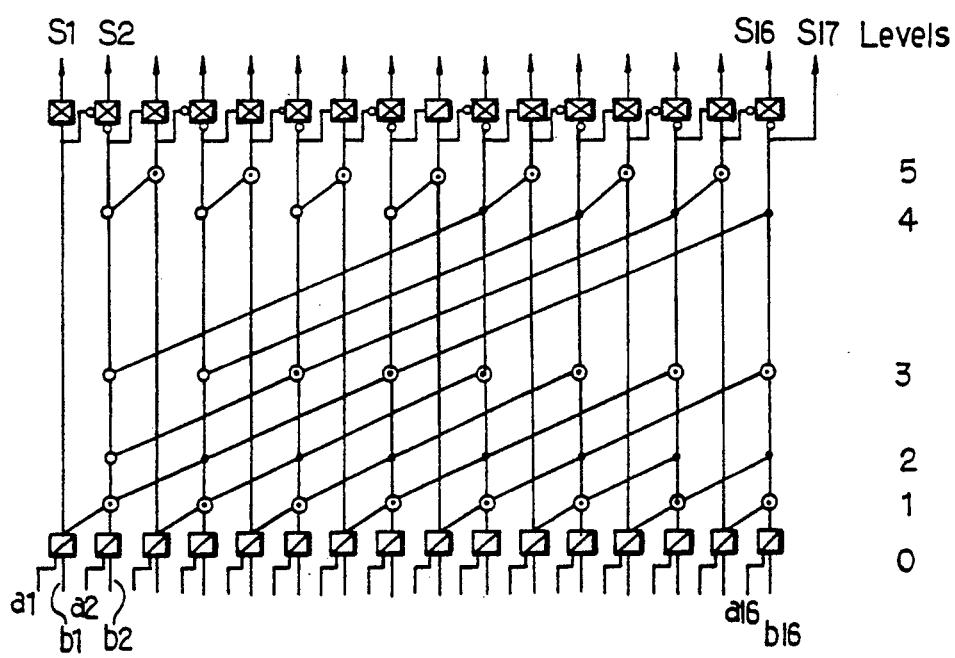
FIG. 7 is diagram illustrating a hybrid prefix adder.
Figure 7:
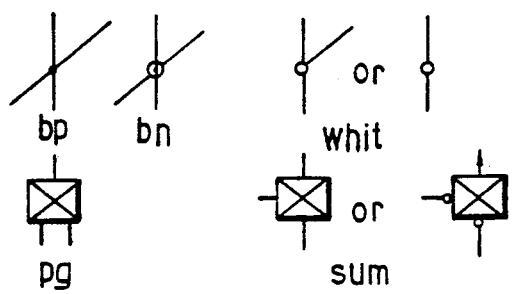

FIG. 7 shows the structure of the hybrid prefix adder HPA which adds two 16bit numbers (a16, a15, ..., a1) and (b16, b15, ... b1) to get the result (s17, s16, ... S1). In FIG. 7, two subscripts P or g indicates the line and the column respectively and ai, bi, ci and si indicates ith augend, ith addend, ith carry, and ith sum, respectively. Each cell described above comprises NMOS and PMOS transistors. This hybrid prefix adder HPA was already disclosed by the IEEE International Conference on Computer Design in the title of "VLSI Design of High-Speed, Low-Area Addition circuitry" by the present applicant. In this invention, the fast operation speed can be obtained by using the hybrid prefix adder HPA (refer to IEEE conference paper mentioned above). The parallel multiplier of the present invention has a larger chip area in view of the multiplier using the array, while perferably having a reduced multiplication time from 0(n) to 0(log n).

As compared with the multiplier using the conventional Wallace tree which has been known as the fastest parallel multiplication algorithm, the chip area of the multiplier using both of the skip array SAP and the modified Wallace tree MWT is reduced from $O(2n^2 \log n)$ to $O(n^2 \log n + 2n^2)$, even through the operation time is $O(\log n)$ in both of the conventional Wallace tree and this modified Wallace tree MWT. But, in the range of less than 128 bits, the modified Wallace tree MWT is faster than the conventional one in its multiplication speed, providing the following effects:

1) Fast multiplication of $O(\log n)$ is performed and the regularity is improved so that the chip area is minimized and the design becomes simple, thereby reducing the manufacturing cost;

2) By using the skip array SAP, the regularity is improved and thus the chip area is minimized and the design becomes simple, maintaining the operation time of $O(\log n)$;

3) By using the modified Wallace Tree MWT, the operation time is reduced by removing the standby state 802 the carry output;

4) By using the hybrid prefix adder HPA, the operation time is reduced and the regularity is improved, so that the chip area is minimized;

5) By arranging the positive input-negative output cells and the negative input-positive output cells in turn, the delay time is reduced and the number of gates is also reduced;

6) Comparing with the parallel multiplier using the array, the operation time is reduced from $O(n)$ to $O(\log n)$, even though its chip area is large. Further comparing with the parallel multiplier using only the conventional Wallace tree, the multiplier using both of the skip array SAP and modified Wallace tree MWT according to the present invention has a minimized chip area from $O(2n^2 \log n)$ to $O(n^2 \log n + 2n^2)$ and its operation time becomes faster in the range of less than 128-bit; in spite of the operation time complexity of $O(\log n)$.

7) Consequently a superior parallel multiplier and an adder with high performance are developed; and 8) By applying the parallel multiplier according to the present invention to the ALU(Arithmetic Logic Unit), the facsimile telegraph, the digital signal processing system, the matrix multiplier and the specially purposed chip, the performance capacity thereof can be improved.

The invention is in no way limited to the embodiment described hereinabove. Various modifications of the disclosed embodiment as well as other embodiments of the invention will become apparent to persons skilled in the art upon reference to the description of the invention. It is, therefore, contemplated that the appended claims will cover any such modifications or embodiments as fall within the true scope of the present invention.

What is claimed is:

1. A parallel multiplier using a skip array and a modified Wallace tree, comprising:
   a modified Booth's encoder for receiving an n-bit multiplier signal and calculating bit-respective (3 *(n/2)) encoded output signals, wherein n represents respective bits of the multiplier signal, according to a modified Booth's algorithm;
   a skip array for receiving an n-bit multiplicand signal and having input lines for respectively receiving the encoded output signals and output lines, the skip array calculating a reduced number of n/log (n/2) partial products from the multiplicand and encoded output signals;
   a modified Wallace tree for adding binary bits of the partial products in full adders for providing a final carry output signal and a final sum output signal; and
   a hybrid prefix adder for adding the final carry output and sum output signals.

2. A parallel multiplier according to claim 1, wherein the skip array comprises lines of adder cells connected to have a skip interval of n/2 log (n/2).

3. A parallel multiplier according to claim 2, wherein said modified Wallace tree comprises:
   first full adders (61, 71, 81) receiving the binary bits (P0 to P8) of the partial products for generating first carry output signals and first sum output signals;
   a second full adder (91) receiving the first carry output signals for generating a second carry output signal and a second sum output signal;
   a third full adder (92) receiving the first sum output signals for generating a third carry output signal and a third sum output signal;
   a fourth full adder (93) receiving the second sum and carry output signals and the third carry output signals for generating a fourth carry output signal and a fourth sum output signal; and
   a fifth full adder receiving the fourth sum and carry output signals and the third sum output signal for generating the final sum and carry output signals.

4. A parallel multiplier according to claim 2, wherein the skip array separates the partial products into groups of n/2 log (n/2) partial products, the skip array has a skip number of log (n/2)−3, and the skip array has an operation time complexity of skips of log (n/2)−2.

5. A parallel multiplier according to claim 1, wherein said modified Wallace tree comprises:
   first full adders (61, 71, 81) receiving the binary bits (P0 to P8) of the partial products for generating first carry output signals and first sum output signals;
   a second full adder (91) receiving the first carry output signals for generating a second carry output signal and a second sum output signal;
   a third full adder (92) receiving the first sum output signals for generating a third carry output signal and a third sum output signal;
   a fourth full adder (93) receiving the second sum and carry output signals and the third carry output signals for generating a fourth carry output signal and a fourth sum output signal; and
   a fifth full adder receiving the fourth sum and carry output signals and the third sum output signal for generating the final sum and carry output signals.

6. A parallel multiplier according to claim 5, wherein the skip array separates the partial products into groups of n/2 log (n/2) partial products, the skip array has a skip number of log (n/2)−3, and the skip array has an operation time complexity of skips of log (n/2)−2.

7. A parallel multiplier according to claim 1, wherein the skip array separates the partial products into groups of n/2 log (n/2) partial products, the skip array has a skip number of log (n/2)−3, and the skip array has an operation time complexity of skips of log (n/2)−2.

* * * * *

UNITED STATES PATENT AND TRADEMARK OFFICE
CERTIFICATE OF CORRECTION

PATENT NO. : 5,181,185
DATED : January 19, 1993
INVENTOR(S) : Tack D. HAN, et al.

It is certified that error appears in the above-identified patent and that said Letters Patent is hereby corrected as shown below:

Title page, item [73], Samsumg"

should be -- Samsung --.

Signed and Sealed this

Twenty-second Day of March, 1994

*Attest:*

BRUCE LEHMAN

*Attesting Officer*     *Commissioner of Patents and Trademarks*